E. G. HOFFMANN, DEC'D.
A. W. KIDDLE & A. M. BECKER, EXECUTORS.
ELECTRIC MOTOR.
APPLICATION FILED JULY 27, 1907.
1,129,036.
Patented Feb. 16, 1915.
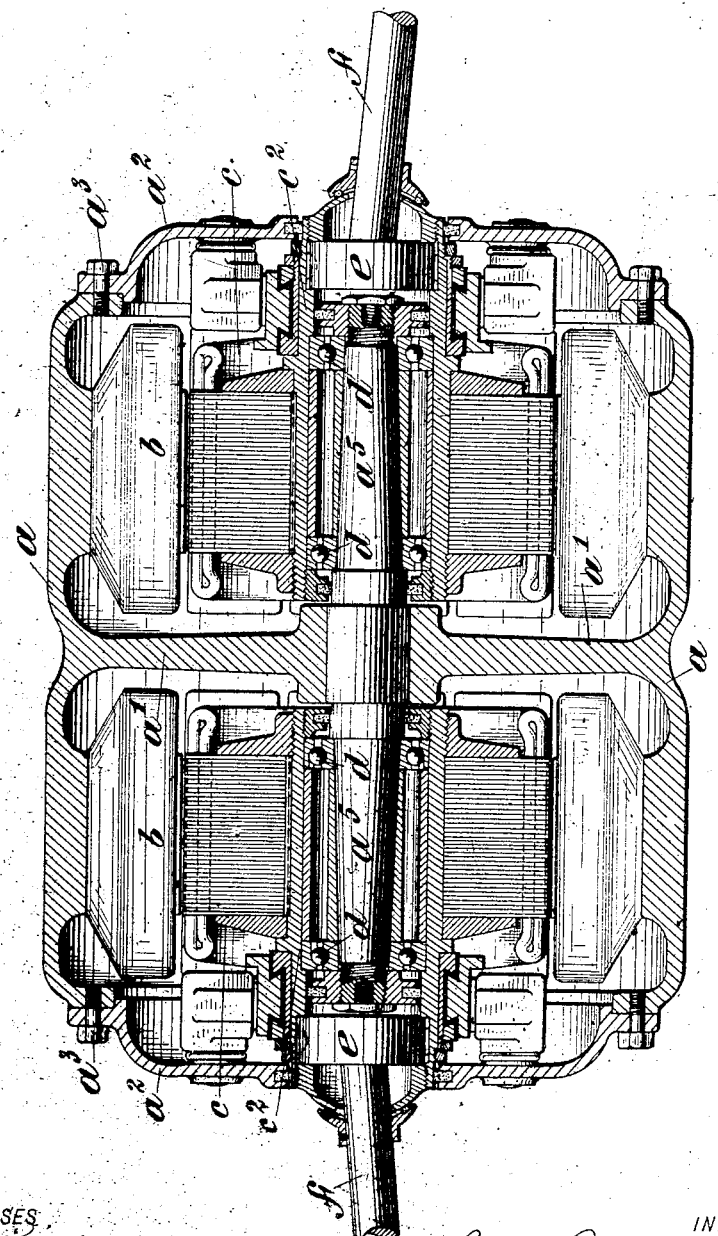

UNITED STATES PATENT OFFICE.

ERNST GUSTAV HOFFMANN, OF NEW ROCHELLE, NEW YORK; ALFRED W. KIDDLE AND AMALIE MATHILDE BECKER EXECUTORS OF SAID HOFFMANN, DECEASED.

ELECTRIC MOTOR.

1,129,036.   Specification of Letters Patent.   Patented Feb. 16, 1915.

Application filed July 27, 1907. Serial No. 385,906.

*To all whom it may concern:*

Be it known that I, ERNST GUSTAV HOFFMANN, a citizen of the United States, residing in the city of New Rochelle, in the county of Westchester, in the State of New York, have invented certain new and useful Improvements in Electric Motors, of which the following is a specification, reference being had to the accompanying drawings, forming a part hereof.

This invention relates to electric motors and especially to slow speed electric motors in which the armatures are of considerable diameter and weight.

The objects of the invention are to enable motors of the type mentioned to be made more compact as regards length, to protect the bearings effectually from dust, etc., and to better adapt such motors for direct coupling to the driven part, especially in the application of such motors to the propulsion of motor vehicles.

In the improved motor the bearings for the armature shaft are supported wholly within the field casing, so that bearings external to such casing are dispensed with, and the coupling between the armature shaft and the driving shaft is located within the chambered or hollowed armature shaft and within the ends of the field casing. These and other features of improvement will be more particularly explained hereinafter with reference to the accompanying drawings in which the invention is illustrated in several different embodiments and in which—

The sole figure is a view partly in longitudinal section and partly in elevation of a twin motor which embodies the invention.

In the embodiment of the invention as shown in the drawing the field casing $a$ has cast with it the end, or intermediate plate $a'$, which is common to both of the twin motors, and has at each end thereof the end plates $a^2$ secured thereto by bolts $a^3$. In order that the motor casing may directly support the armature $c$ there is secured in the plate $a'$ a stationary shaft or axle $a^5$ which, through suitable bearings $d$, receives upon it the armature shaft $c^2$. This armature shaft $c^2$ is hollow from end to end and carries all parts of the armature. A universal coupling $e$ is also employed and this is located between the armature shaft $c^2$ and the driving shaft $f$. This coupling is located within the hollow armature shaft and between the ends of the case $a$, but it is preferably placed near the outer end of the armature shafts in order that the stationary shafts or axles $a^5$ may extend a material distance into the hollow rotatable armature shafts.

It will be observed that the driving shafts $f$ are coupled to the armature shafts between the end plates $a^2$ so that when the motor is employed, for example, in the propulsion of a motor vehicle, and the driving shaft is connected at its other end to the driving wheel of a vehicle, the possible length of the driving shaft $f$ is less limited than would be the case if it were coupled to the armature shaft outside of the casing, and the range or angular displacement of the driving shaft necessary to accommodate the relative movement of the motor and driving wheel is reduced. Due to the construction previously described, it will also be noted that the motor occupies longitudinally of its axis the minimum of space, and that the armature bearings are wholly inclosed within the casing and protected from the dust. It is, of course, unnecessary herein to describe in detail the construction of the bearings, commutators or controllers, as they may be of any ordinary or suitable character. It will furthermore be noted that various changes in the details of construction and the arrangements of the parts may be made without departing from the spirit and scope of the invention.

I claim as my invention:

1. A twin motor construction having a casing, two sets of field coils, rotating armatures, and a fixed shaft carried by said casing upon which said armatures rotate, said casing comprising an integral outer member within which there is located the two sets of field coils and also being provided between said field coils with an intermediate plate member that serves at least as a partial support for the fixed shaft, the armatures being located upon the opposite sides of said intermediate plate member.

2. A motor construction having a casing, two sets of field coils supported within said casing, armatures coöperating with said field coils and a shaft construction for supporting said armatures, said casing comprising an integral member or portion which extends over both sets of field coils, removable end casings or plate members at the ends thereof and also an intermediate plate member or portion, the latter of which is located between the field coils and receives support from said integral portion that extends over said field coils, said armatures being supported at least partially on a shaft construction that is mounted on said intermediate portion, and which armatures are located upon opposite sides of said intermediate portion.

3. A motor construction comprising in combination two sets of field coils, revolving armatures coöperating therewith and a casing which supports both of said sets of field coils, there being integral with said casing a partition or plate which carries supports for adjacent ends of the armatures.

4. A motor construction comprising in combination a casing having therein and integral therewith an intermediate support, a fixed shaft carried by and extending on opposite sides of the intermediate support and armatures located upon opposite sides of the intermediate support and revolubly mounted on the fixed shaft.

5. A motor construction comprising in combination a casing having therein and integral therewith an intermediate support, a fixed shaft having portions on opposite sides of the support, armatures located on opposite sides of the intermediate supports and revolubly mounted on said fixed shaft, a driving shaft having a flexible connection with one of the armatures and extending in one direction, and another driving shaft having a flexible connection with another of the armatures and extending in the opposite direction to that in which the first mentioned driving shaft extends.

This specification signed and witnessed this 22d day of July, 1907.

ERNST GUSTAV HOFFMANN.

Signed in the presence of—
W. B. GREELEY,
LUCIUS E. VARNEY.